(12) United States Patent
Franzi

(10) Patent No.: US 12,141,258 B2
(45) Date of Patent: Nov. 12, 2024

(54) WATCH INCLUDING A SYSTEM FOR CONTROLLING BIOMETRIC ACCESS TO CONFIDENTIAL DATA

(71) Applicant: Tissot SA, Le Locle (CH)

(72) Inventor: Edoardo Franzi, Cheseaux-Noreaz (CH)

(73) Assignee: Tissot SA, Le Locle (CH)

( * ) Notice: Subject to any disclaimer, the term of this patent is extended or adjusted under 35 U.S.C. 154(b) by 204 days.

(21) Appl. No.: 17/781,252

(22) PCT Filed: Nov. 20, 2020

(86) PCT No.: PCT/EP2020/082819
§ 371 (c)(1),
(2) Date: May 31, 2022

(87) PCT Pub. No.: WO2021/110427
PCT Pub. Date: Jun. 10, 2021

(65) Prior Publication Data
US 2022/0414197 A1     Dec. 29, 2022

(30) Foreign Application Priority Data

Dec. 6, 2019    (EP) .................................. 19214185

(51) Int. Cl.
*G06F 21/32*    (2013.01)
*G04G 9/00*     (2006.01)
(Continued)

(52) U.S. Cl.
CPC .............. *G06F 21/32* (2013.01); *G04G 9/007* (2013.01); *G04G 21/025* (2013.01); *G06F 21/62* (2013.01); *G06F 2221/2141* (2013.01)

(58) Field of Classification Search
None
See application file for complete search history.

(56) References Cited

U.S. PATENT DOCUMENTS 10,154,031 B1 * 12/2018 Lerner .................... H04L 9/002
10,701,067 B1 *  6/2020 Ziraknejad ............ H04W 12/63
(Continued)

FOREIGN PATENT DOCUMENTS

CN    104933335 A    9/2015
CN    105022265 A    11/2015
(Continued)

OTHER PUBLICATIONS

International Search Report issued Jan. 28, 2021 in PCT/EP2020/082819 filed on Nov. 20, 2020, 2 pages.
(Continued)

*Primary Examiner* — Jeffrey R Swearingen
(74) *Attorney, Agent, or Firm* — Oblon, McClelland, Maier & Neustadt, L.L.P.

(57) ABSTRACT

A method controls access to at least one confidential data access to which by a function of a watch requires an identification of its wearer. The method includes authenticating the wearer of the watch to authorise access to the functions of this watch, selecting one of the functions of the watch requiring the use of at least one of the confidential or general data archived in the memory element, determining the category to which the at least one data required by the function belongs, verifying the identity of the wearer of the watch from at least one biometric information element comprised within a portion of the skin of this wearer when the at least one data is the confidential data, and authorizing use of the at least one confidential data by the function as soon as the identity of the wearer of the watch is verified.

10 Claims, 1 Drawing Sheet

(51) Int. Cl.
*G04G 21/02* (2010.01)
*G06F 21/62* (2013.01)

(56) References Cited

U.S. PATENT DOCUMENTS

| | | | |
|---|---|---|---|
| 2014/0119617 A1 | 5/2014 | Bertin | |
| 2015/0135310 A1* | 5/2015 | Lee | H04W 12/065 726/20 |
| 2015/0220109 A1 | 8/2015 | Von Badinski et al. | |
| 2015/0242605 A1* | 8/2015 | Du | G06F 21/32 726/7 |
| 2016/0004224 A1 | 1/2016 | Pi | |
| 2016/0246326 A1 | 8/2016 | Von Badinski et al. | |
| 2016/0283809 A1* | 9/2016 | Rice | G06V 40/107 |
| 2016/0364560 A1* | 12/2016 | Yan | G06F 21/32 |
| 2017/0017785 A1* | 1/2017 | Rice | H04N 23/60 |
| 2017/0032168 A1* | 2/2017 | Kim | H04L 63/0861 |
| 2017/0235332 A1 | 8/2017 | Von Badinski et al. | |
| 2017/0235333 A1 | 8/2017 | Von Badinski et al. | |
| 2017/0235334 A1 | 8/2017 | Von Badinski et al. | |
| 2017/0235933 A1 | 8/2017 | Von Badinski et al. | |
| 2018/0181733 A1 | 6/2018 | Shim et al. | |
| 2018/0225437 A1* | 8/2018 | Suh | A61B 5/117 |
| 2018/0227754 A1* | 8/2018 | Paez Velazquez | H04L 63/0428 |
| 2018/0247036 A1* | 8/2018 | Vincent | H04W 12/065 |
| 2019/0000370 A1* | 1/2019 | Boshra | A61B 5/0086 |
| 2019/0086951 A1 | 3/2019 | Von Badinski et al. | |
| 2019/0188604 A1* | 6/2019 | Amitava | G06N 20/00 |
| 2019/0204865 A1 | 7/2019 | Von Badinski et al. | |
| 2019/0384354 A1 | 12/2019 | Von Badinski et al. | |
| 2020/0046235 A1* | 2/2020 | Jung | A61B 5/6898 |
| 2020/0089272 A1 | 3/2020 | Von Badinski et al. | |
| 2020/0401183 A1 | 12/2020 | Von Badinski et al. | |

FOREIGN PATENT DOCUMENTS

| | | |
|---|---|---|
| CN | 106231997 A | 12/2016 |
| FR | 2 997 528 A1 | 5/2014 |
| FR | 3 034 599 A1 | 10/2016 |
| KR | 10-2016-0124834 | 10/2016 |
| KR | 10-2017-0043441 | 4/2017 |
| WO | WO 2018/231713 A1 | 12/2018 |

OTHER PUBLICATIONS

Combined Chinese Office Action and Search Report issued Jan. 6, 2024, in corresponding Chinese Patent Application No. 202080084332.6 (with English Translation of Category of Cited Documents), 7 pages.

Korean Office Action issued in Korean Patent Application No. 10-2022-7017883 on Jul. 23, 2024, w/ English translation.

* cited by examiner

WATCH INCLUDING A SYSTEM FOR CONTROLLING BIOMETRIC ACCESS TO CONFIDENTIAL DATA

CROSS-REFERENCE TO RELATED APPLICATIONS

The present application is a national stage entry of International Application No. PCT/EP2020/082819, filed Nov. 20, 2020, which claims priority to European Patent Application No. 19214185.1, filed on Dec. 6, 2019, the entire content and disclosure of which are incorporated by reference herein.

TECHNICAL FIELD

The present invention relates to a watch including a system for biometrically controlling access to confidential data archived in a memory element of this watch. More specifically, the invention covers a method for controlling access to at least one confidential data archived in a memory element of a watch and a system implementing such a method.

The invention also relates to a computer program.

PRIOR ART

A watch comprises a set of functions that could be used by the wearer. Such functions could allow consulting personal data of this wearer or else accessing services such as banking services, commercial services (online shops, e-commerce businesses) or electronic messaging services or instant messaging. In such a context, a drawback herein lies in the fact that once the wearer of the watch has been authenticated, it is possible for any individual to have access to the functions of the watch, in particular in the case where the latter has been stolen and thus be able to access the personal and confidential data of the wearer.

It should be understood that there is a need to find a solution, in particular one that does not have the drawbacks of the prior art.

SUMMARY OF THE INVENTION

Consequently, the present invention aims to provide a secure, reliable, sure and robust solution allowing controlling access to the confidential data archived in a memory element of a watch.

For this purpose, the method for controlling access to at least one confidential data archived in a memory element of a watch, said memory element comprising two data categories, general data and said confidential data access to which by a function of said watch requires an identification of its wearer, the method including the following steps:
  authentication of the wearer of the watch in order to authorise access to the functions of this watch;
  selection of one of said functions of the watch requiring the use of at least one of said confidential or general data archived in the memory element;
  determination of the category to which said at least one data required by the function belongs;
  verification of the identity of the wearer of the watch from at least one biometric information element comprised within a portion of the skin of this wearer when said at least one data belongs to the category of the confidential data, and
  authorisation to use said at least one confidential data by the function as soon as the identity of the wearer of the watch is verified.

In other embodiments:
  the determination step comprises a sub-step of estimating a criterion for access to said data which defines the association of said data to the confidential data category or to the general data category;
  the determination step comprises a sub-step of comparing between the estimated access criterion and a reference criterion;
  the verification step comprises a sub-step of acquiring by at least one skin multispectral biometric sensor comprised within the watch, a plurality of images of a portion of the skin of the wearer adjacent to said sensor, said images comprising said at least one biometric information element comprised within this skin portion;
  the verification step comprises a sub-step of generating a digital identification element from said at least one biometric information element comprised within the acquired images of the skin portion;
  the verification step comprises a sub-step of validating a digital identification element generated in anticipation of the identification of the wearer;
  the biometric information element relates to a vascular network or to a texture of this skin.

The invention also relates to a system for controlling access to at least one confidential data archived in a memory element of a watch, implementing the method according to any one of the preceding claims, the system comprising the following elements linked together: a processing unit, a skin multispectral biometric sensor, an input interface, an interface for broadcasting visual information and the memory element comprising two data categories, general data and said confidential data.

The invention also relates to a watch, in particular a mechanical smartwatch, including such a system.

A computer program comprising program code instructions for the execution of the steps of the method when said program is executed by a processing unit.

BRIEF DESCRIPTION OF THE FIGURES

Other features and advantages will appear clearly from the description given hereinafter, for indication and without limitation, with reference to the appended figures, wherein.

DETAILED DESCRIPTION OF THE INVENTION

Figure 1:
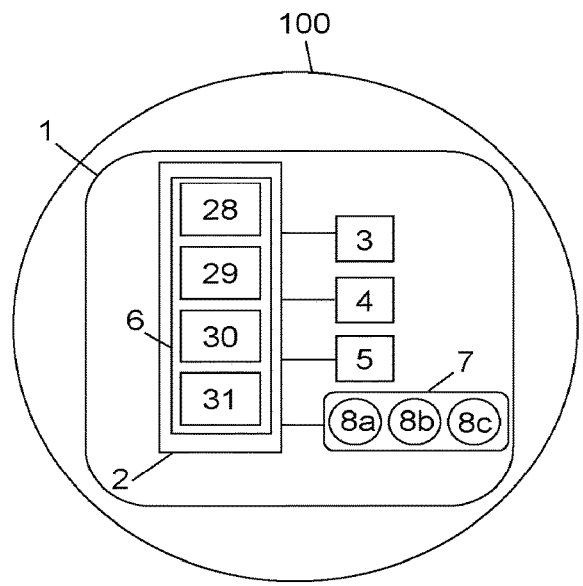
FIG. 1 is a schematic representation of a watch comprising a system for controlling access to at least one confidential data archived in a memory element of this watch, according to an embodiment of the invention.

In FIG. 1, a watch is represented comprising a system 1 for controlling access to at least one confidential data archived in a memory element of this watch. Preferably, such a watch 100 is a mechanical smartwatch 100 comprising a body such as a watch case, and an attachment element such as a wristlet allowing attaching this body, for example, to the wrist of the wearer. More specifically, this watch 100 comprises in a non-limiting and/or non-exhaustive manner:

a processing unit 2 including hardware and software resources in particular at least one processor cooperating with a memory element 3, said memory element 3 comprising in particular two data categories, general data 31 and confidential data 28;

a visual information broadcast interface 4 such as a hybrid display dial provided with a first analog display component and a second digital and/or alphanumeric display component;

an input interface 5 such as a keyboard or else a touch interface comprised for example within the interface for broadcasting visual information 4, and a skin multispectral biometric sensor 7 comprising at least one photographic sensor 8a, at least one multispectral lighting source 8b and at least one thermal image sensor 8c, the lighting source 8b being able to emit a light radiation in wavelengths comprised between 300 and 1,100 nm, in addition this light source 8b may be of the laser type.

In the present embodiment of the invention, the confidential data 28 are personal/secret/private data of the wearer of the watch 100 and access to which by a given function of this watch 100 requires the identification of the wearer. In turn, the general data are so-called "public" data that could relate to the wearer and to which a given function could freely access. For example, the confidential data 28 may comprise digital files relating to images, videos, documents (for example in text, spreadsheet, XML, etc. format) including confidential information like personal information of the wearer (bank information, name, address, date of birth, weight, age, gender, heart rate, sleep cycle, etc.). These confidential data 28 may also comprise encryption/decryption keys, certificates, authentication codes, passwords and personal codes.

In this watch 100, the processing unit 2 is connected, inter alia, to the interface for broadcasting visual information 4, to the input interface 5 as well as to the multispectral biometric sensor 7. Besides, it should be noted that the multispectral biometric sensor 7 is arranged in the body of the electronic device 100 and/or in the attachment element.

This watch 100 is adapted to ensure the control of the identity of the authenticated wearer in a discreet manner, i.e. without any direct intervention/interaction of the wearer with this watch 100 and that being so, as long as the watch is worn. The identification of the wearer is then performed in a transparent and discreet manner and that being so, starting from at least one biometric information element comprised within the skin of this wearer such as the vascular network of the skin or else the texture of this skin. This skin of the wearer which covers his body has a particularity, less obvious to consider by a person skilled in the art because it cannot be naturally viewed by the human eye, related to the absorption and reflection characteristics at different wavelengths (spectrum) of the components of the skin, located at different depths. In a simplified model, the skin is formed by a layer called the "epidermis", semi-transparent and located at the surface, then, beneath the epidermis, a layer called the "dermis" and comprising, inter alia, the blood vessels (or vascular network) in which haemoglobin is highly reflective at long wavelengths close to red, being for example comprised between 760 and 930 nm, which herein allows revealing or highlighting the vascular network of the skin of the wearer. In other words, the light absorption spectrum of the components of the epidermis and of the dermis forming the skin not being uniform according to the electromagnetic wavelengths, the appearance and the colour of the skin result from a complex combination of these phenomena. Thus, when it is desired to highlight or reveal a biometric information element like the texture of the skin of this wearer, a texture essentially formed by crevices or cavities, the lighting of the skin could then be ensured by a lighting source restricted to the wavelengths around red which tends to make the phenomenon of shadows disappear from the bottom of the crevices. Indeed, there is a back projection effect by reflection on the dermis and through the epidermis of these wavelengths close to red, while lighting of the skin by a source with a colorimetric spectrum far from red, typically the wavelength band located between violet (400 nm) and up to yellow-orange (600 nm) allows, on the contrary, significantly contrasting these crevices in the skin by the apparition of shadows at the bottom of these crevices. It should be noted that the identification of a biometric information element comprised within the skin could be improved by the use of the thermal image sensor 8c preferably without lighting. For example, to highlight the texture of the skin, in particular when the considered portion of the skin of this wearer is provided with hair, the use of the thermal image sensor 8c allows revealing the crevices of this texture of the skin which are generally warmer than the surrounding skin and the hairs are cooler than this surrounding skin. Thus, in this configuration, the hairs could be thermally distinguished from the crevices of the texture of the skin by this difference between their respective temperatures.

It should be noted that the capture of thermal images could be carried out under lighting in a given wavelength depending on the biometric information element that should be highlighted or revealed.

Hence, it should be understood that, according to the principle of the invention, the identification of the wearer is carried out from at least one biometric information comprised within images of a portion of the skin of this wearer which could be lit up, where appropriate, according to different wavelengths in order to capture images comprising the pursued biometric information element. Thus, this biometric information element, comprised within these images, could be highlighted by lighting performed in different wavelengths or without lighting, for example when a capture of thermal images is to be carried out.

In this watch, the memory element 3 of the processing unit 2 of the watch 100 comprises confidential data 28 and general data 31 as well as parameters for classifying these data into either one of these two confidential or general categories. These memory elements 3 also include image digital processing algorithms 29 allowing characterising at least one biometric information element relating to the skin of the wearer and which is comprised within the images relating to the portion of the skin of the wearer. This memory element 3 also includes algorithms 30 for generating the reference digital identification element but also a digital identification element.

Figure 2:
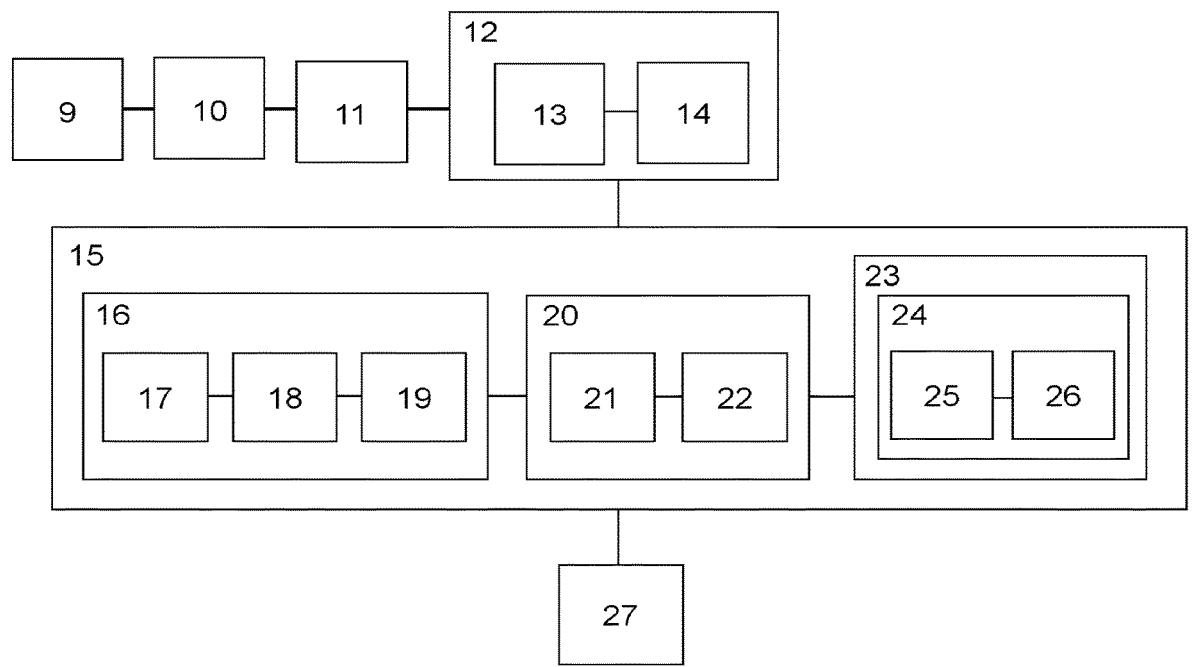
FIG. 2 is a flowchart relating to a method for controlling access to at least one=confidential data archived in the memory element of the watch, according to the embodiment of the invention.

As illustrated in FIG. 2, the system 1 is adapted to implement a method for controlling access to at least one confidential data archived in a memory element of a watch, said memory element comprising two data categories, general data 31 and said confidential data 28.

This method comprises a step 9 of authenticating the wearer of the watch 100 authorising access to the use of functions of this watch 100. Hence, this authentication step 9 allows identifying the wearer of the watch with certainty so that he could have access to the use of all of the functions of this watch 100. In other words, it enables the wearer to provide proof of his identity by providing for the entry of an authentication code or a secret code through an interaction between the wearer and the input interface 34.

Complementarily, it should be understood that the functions could be implemented by processing algorithms executed by the processing unit 2 of the watch 100 as soon as these functions are activated/selected following an interaction between the wearer and the input interface 5 of this watch 100. These algorithms thus executed require a use of general data 31 and/or confidential data 28. In examples set out herein in a non-limiting and non-exhaustive manner, these functions of the watch could relate to an image or video editing function, a word processing function, a function for connecting to a banking service, a function for connecting to a commercial service (online shops, e-commerce businesses), a function for connecting to an electronic messaging or instant messaging service.

Following this authentication step 9, the method comprises a step 10 of selecting one of said functions of the watch requiring the use of at least one of said confidential 28 or general 31 data archived in the memory element. During this step 10, this function is selected from among all of the functions of the watch that are displayed on the visual broadcast interface 4 and that being so, following an interaction between the wearer and the input interface 5 of this watch 100. As we have mentioned before, such an interaction then contributes to the execution by the processing unit 2 of a processing algorithm aiming to carry out this function in particular from at least one data archived in the memory element 3 which herein is necessary for the implementation of this algorithm.

Afterwards, the method comprises a step 12 of determining the category to which said at least one data required by the function belongs. This step 12 comprises a sub-step 13 of estimating a criterion for access to said data which defines the association of said data to the confidential data category 28 or to the general data category 31. This sub-step 13 comprises a phase of implementing computation operations by the processing unit 2 to obtain this access criterion and that being so, starting from said data, the nature or type of the function and a classification parameter for this data. Such a parameter is archived in the memory element of the processing unit of the watch by being associated with the corresponding data. This parameter defines the association of said data to either one of the confidential 28 or general 31 data categories and that being so, according to the nature or type of the different functions of the watch, likely to require such data in the context of implementation thereof.

Thus, this parameter could allow defining that a data such as an image is a confidential data for a given function and a general data for another function of the watch. Hence, it should be understood that in this context, the association of the data item to either one of these two categories relates to the function that requires the use thereof.

Afterwards, the determination step 12 includes a sub-step 14 of comparing between this estimated access criterion and a reference criterion. In this context, said at least one data required by the function belongs to the confidential data 28 category if the access criterion is higher than or equal to the reference criterion. Conversely, if the access criterion is lower than the reference criterion then said at least one data is comprised within the general data category.

Next, the method comprises a step 15 of verifying the identity of the wearer of the watch 100 from at least one biometric information element comprised within a portion of the skin of this wearer as soon as said at least one data belongs to the category of the confidential data 28. Such a step 15 is performed systematically following the determination of the association of at least one data whose use is required for the completion of the selected function, to the category of confidential data 28 and that being so, in particular in order to enable the processing unit 2 to check that the wearer of the watch 100 is still in possession of the latter. This step 15 comprises a sub-step 16 of acquiring by the sensor 7 a plurality of images of a portion of the skin of the wearer, said skin portion being arranged adjacent to said sensor 7, said images comprising said at least one biometric information element comprised within this skin portion. This sub-step 16 comprises a phase 17 of lighting up the skin portion according to different wavelengths. More specifically, during this phase 17, the processing unit 2 controls the multispectral biometric sensor 7 and in particular the lighting source 8b so that the latter emits a light radiation in the direction of the skin portion according to a specific wavelength suited for highlighting or revealing said at least one biometric information element specific to the skin that is herein looked for. Once the lighting has been configured, the acquisition sub-step 16 comprises a phase 18 of capturing an image of this skin portion lit up at least at one wavelength likely to highlight or reveal said at least one biometric information element. During this phase 18, the processing unit 2 controls the skin multispectral biometric sensor 7 and in particular the photographic sensor 8a synchronously with the activation/deactivation of the lighting source 8b at a given wavelength and that being so, in order to capture at least one image relating to the skin portion lit up for at least one wavelength.

This acquisition sub-step 16 may also comprise a phase 19 of capturing at least one thermal image of the skin portion. Preferably, such a phase 19 is carried out without lighting but in other alternatives lighting of the portion may be performed in at least one given wavelength, this obviously depending on the biometric information element that should be highlight or revealed. This phase 19 may be carried out before or after the lighting 16 and image capturing 117 phases.

Afterwards, the verification step 15 comprises a sub-step 20 of generating the digital identification element from said at least one biometric information element comprised within the acquired images of the skin portion. Such a sub-step 20 comprises a phase 21 of characterising said biometric information element comprised within the images relating to said skin portion. During this phase 21, the processing unit 2 implements algorithms 29 for processing the acquired images aiming to identify/detect in each of these said at least one biometric information element comprised therein. As we have already mentioned before, this may be information elements relating for example to the texture of the skin or to the vascular network comprised within this portion of the skin of the wearer. For example, the implementation of these algorithms 29, 30 by the processing unit 2 may provide for a process of cutting these images into segments. It should be understood herein that each acquired image provides an overall view of the portion of the skin of the wearer, and then includes areas of variable relevance for the identification of said at least one biometric information element. Such a cutting process contributes to extracting the segments to be processed and to eliminating the portions that are not to be processed in these images. Afterwards, these algorithms 29 may provide for an indexing of these image segments comprising characteristics relating to said at least one particular biometric information element to be identified, by localisation zones in the skin portion and that being so, in order to be able to assign to each area the adequate treatment with regards to the morphological typology of the characteristic of this geographical area of the portion. In this context, these algorithms 29 process each segment of these images by highlighting the information carried by the pixels of each of these images by carrying out image analysis operations of the processing, transformation and detection type. Next, these algorithms 29 perform filtering and feature extraction or vectorisation operations, in order to convert the image data relating to said at least one identified and extracted biometric information element, into parametric data, typically relative numerical values expressed for example as an index or as a percentage.

It should be understood herein that the acquisition of several images representing the same skin portion under different lighting or without lighting, contributes to improving the accuracy and the efficiency of this characterisation phase 21.

Next, the generation sub-step 20 comprises a phase 22 of designing the digital identification element from the characterisation of said at least one biometric information element. During this phase 22, the processing unit 2 implements algorithms 30 for generating such a digital identification element specifically intended for the processing of the parametric data obtained during the characterisation phase 21, which parametric data relating to said at least one biometric information item.

Afterwards, the verification step 15 comprises a sub-step 23 of validating the digital identification element generated in anticipation of a check-up of the identity of the wearer. This validation sub-step 23 comprises a comparison phase 24, implemented by the processing unit 2, between the generated digital identification element and the reference digital identification element. In this method, the reference digital identification element could be created, as soon as the wearer has been duly authenticated and his identity is certain and that being so, during a step 11 for defining this reference digital identification element providing for sub-steps similar to the acquisition 16 and generation 20 sub-steps implemented during the verification step 15. In this method, once the wearer of the watch 100 has been authenticated, the processing unit 2 implements this definition step 11 and then performs an archiving of the obtained reference digital identification element in the memory element 3 of the processing unit 2. Hence, this reference digital identification element could be determined automatically by the processing unit 2 or configured by the wearer during an adjustment process aiming to guide the wearer in the definition of this reference digital identification element.

This comparison phase 24 comprises a sub-phase for rejecting the identification of the wearer 25 if the generated digital identification element is substantially different or different from the reference digital identification element. In this case, the execution by the processing unit 2 of the processing algorithm aiming to fill this function is stopped by the processing unit 2. In addition, access to watch 100 is also suppressed and in particular access to the functions of this watch. In this context, the wearer of the watch is invited to authenticate himself again, upon a new execution of the authentication step 9, in order to provide proof of his identity by entering an authentication code or a secret code and that being so, through an interaction between the wearer and the input interface 34. Indeed, the wearer and owner of watch 100 could no longer possess it.

The comparison phase 24 also comprises a sub-phase 26 for successfully identifying the wearer if the generated digital identification element is substantially similar or similar to the reference digital identification element. In this case, the method then provides for the implementation of a step 27 of authorising the use of said at least one data belonging to the category of confidential data 28 as soon as the identity of the wearer of the watch is verified. During this step 27, the processing unit 2 carries on the execution by the processing algorithm aiming to fill this function from the data archived in the memory element 6.

The invention also covers a computer program comprising program code instructions for the execution of steps 10 to 27 of this method when said program is executed by the processing unit 2 of the watch 100.

The invention claimed is:

1. A method for controlling access to at least one confidential data archived in a memory element of a watch, said memory element comprising two data categories, general data and said confidential data, access to which by a function of said watch requires an identification of its wearer, the method comprising:
   authenticating the wearer of the watch in order to authorize access to the functions of the watch, the authenticating including receiving a code entered by the wearer of the watch to an input interface of the watch;
   after the authenticating, selecting one of said functions of the watch requiring the use of at least one of said confidential or general data archived in the memory element;
   determining the category to which said at least one data required by the function belongs;
   verifying performed systematically following the determination of the association of at least one data whose use is required for the completion of the selected function, of the identity of the wearer of the watch from at least one biometric information element comprised within a portion of the skin of the wearer when said at least one data belongs to the category of the confidential data, wherein the verifying includes lighting the portion of the skin with different wavelengths of light and capturing an image of the portion of the skin lit up with at least one of the different wavelengths of light, wherein the verifying includes, after the capturing the image, capturing a thermal image of the portion of the skin without lighting, and
   authorizing use of said at least one confidential data by the function as soon as the identity of the wearer of the watch is verified,
   the determining comprising estimating a criterion for access to said data which defines the association of said data to the confidential data category or to the general data category, said estimating comprising a phase of implementing computation operations by a processing unit to obtain the access criterion and that being so, starting from said data, the nature or type of the function and a classification parameter for the data, said parameter defining the association of said data to either one of the confidential or general data categories and that being so, according to the nature or type of the different functions of the watch, likely to require such data in the context of implementation thereof.

2. The method according to claim 1, wherein the determining comprises comparing between the estimated access criterion and a reference criterion.

3. The method according to claim 1, wherein the verifying comprises acquiring, by at least one skin multispectral biometric sensor comprised within the watch, a plurality of images of a portion of the skin of the wearer adjacent to said sensor, said images comprising said at least one biometric information element comprised within the skin portion.

4. The method according to claim 1, wherein the verifying comprises generating a digital identification element from said at least one biometric information element comprised within the acquired images of the skin portion.

5. The method according to claim 1, wherein the verifying comprises validating a digital identification element generated in anticipation of the identification of the wearer.

6. The method according to claim 1, wherein the biometric information element relates to a vascular network or to a texture of the skin.

7. A system for controlling access to at least one confidential data archived in a memory element of a watch, the system being configured to implement the method according to claim 1, the system comprising:
- a processing unit,
- a skin multispectral biometric sensor,
- the input interface,
- an interface for broadcasting visual information; and
- the memory element comprising two data categories, general data and said confidential data.

8. A watch, comprising: the system according to claim 7.

9. The watch according to claim 8, wherein the watch is a mechanical smartwatch.

10. A non-transitory computer readable medium comprising a program that, when executed by a computer, causes the computer to execute the method according to claim 1.

\* \* \* \* \*